United States Patent
LaGrange et al.

[11] 3,857,042
[45] Dec. 24, 1974

[54] LASER SEEKER TEST SET

[75] Inventors: Don E. LaGrange, Los Angeles; Edward J. Davis, China Lake; Eugene R. Sheer, Ridgecrest; Ralph E. Brewer, Ridgecrest; Curtis A. Hamilton, Ridgecrest, all of Calif.

[73] Assignee: The United States of America as represented by the Secretary of the Navy, Washington, D.C.

[22] Filed: Oct. 26, 1973

[21] Appl. No.: 409,996

[52] U.S. Cl. .................... 250/495, 73/1 F, 244/3.16
[51] Int. Cl. ............................................ G21h 5/00
[58] Field of Search .......... 250/495, 504, 338, 340, 250/349; 102/38; 244/3.16, 14; 343/17.7; 356/152; 273/98, 101, 105.3; 240/1 A; 40/130 R; 73/1 R, 1 F; 219/553

[56] References Cited
UNITED STATES PATENTS

| | | | |
|---|---|---|---|
| 3,227,879 | 1/1966 | Blau et al. | 219/553 X |
| 3,383,902 | 5/1968 | Cragin et al. | 250/495 X |
| 3,478,211 | 11/1969 | Moser | 250/340 |

Primary Examiner—James W. Lawrence
Assistant Examiner—Davis L. Willis
Attorney, Agent, or Firm—R. S. Sciascia; Roy Miller; Gerald F. Baker

[57] ABSTRACT

A target simlator comprising a sequencing infrared source and a plurality of binary coded inputs is used to test the reaction of a missile seeker which operates on the principal of a parabolic mirror being flooded with parallel light rays which in turn are reflected onto the detector. The light rays are either parallel to the center line axis of the missile or at some angle thereto. The angle of these rays with respect to the missile centerline is detected by the missile guidance system to cause the missile to track the rays. The target simulator according to the present invention utilizes this principle without flooding the entire mirror using a ¼ inch column of parallel light rays from sequenced infrared sources.

8 Claims, 6 Drawing Figures

Patented Dec. 24, 1974

LASER SEEKER TEST SET

BACKGROUND OF THE INVENTION

This invention relates to testing systems and more particularly to target simulating systems for testing tracking apparatus. More particularly the invention relates to the simulation of moving target reflected radiation to test laser guided missile seekers before flight.

As missile guidance and control systems become more sophisticated, the price of the missile rises and it is increasingly important to test the guidance and control system thoroughly before certifying the missile to use. It is especially advantageous to be able to final test on the aircraft. The target simulator and test equipment according to the present invention is designed to ensure that the guidance and control system of a laser guided missile, for example, is in proper working order. The system may be used with the missile before delivery to a launching vehicle or may be adapted for use with the missile in place on the aircraft.

SUMMARY OF THE INVENTION

The simulation of a moving light emitting target is accomplished by sequencing a plurality of small light emitting diodes at a rate not exceeding the tracking rate of the laser seeker being tested. Digital circuitry is used to determine the sequence and the timing of the sequence. Digital circuitry is also provided which gives the capability to manually sequence the diodes as desired. The diodes emit a collimated beam of energy at different angles to the longitudinal axis of the missile.

By visually observing either the seeker head activity or instrumentation attached to the missile, the capability of the seeker tracking unit can be determined before flight. This may be accomplished with the missile attached to the aircraft by observing the instrumentation in the aircraft.

The test equipment may be arranged in a housing which can be quickly and securely fixed to a missile nose section in a predetermined position with respect to the seeker unit.

DESCRIPTION AND OPERATION

Figure 1:
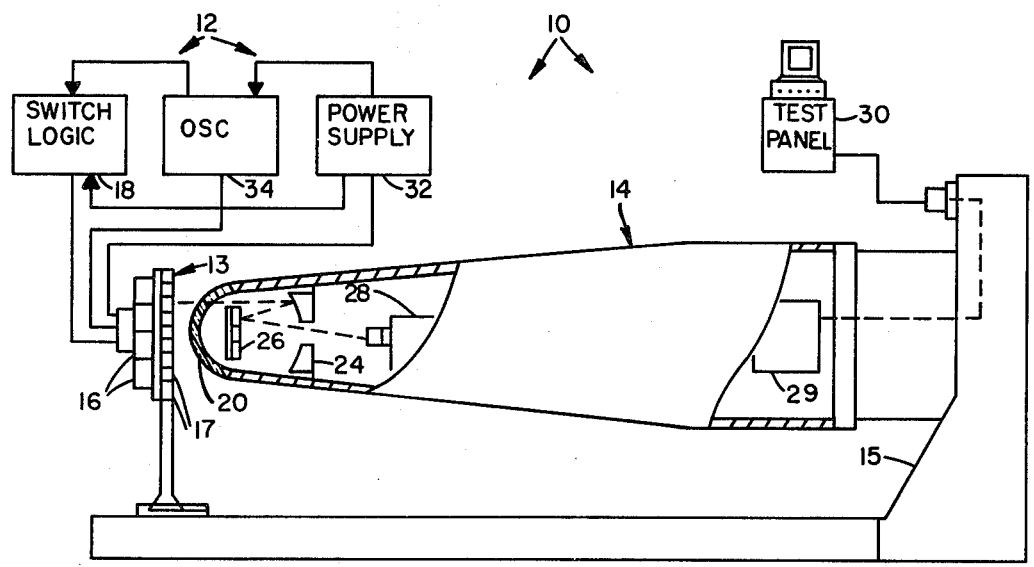
FIG. 1 is a diagrammatic view constituting a schematic illustration of a system according to the invention.

As shown in FIG. 1, the test arrangement 10 comprises a target simulator 12 aligned with the nose section 14 of a guided missile, for example, on a test stand 15. The simulator 12 comprises a linear array 13 of small light-emitting diodes 17 actuated by driver circuitry 16 under the control of logic circuit means 18.

When any of the diodes 17 in array 13 are "illuminated," they emit infrared rays (represented by broken line) which are beamed through the window 20 of nose section 14 and these rays impinge on a toroidal parabolic primary mirror 24 which focuses the rays on a secondary mirror 26 which in turn reflects the rays to detector means 28. Detector means 28 generates pulses in accordance with directional parameters of the received radiation. The pulses generated are then applied to the missile logic section 29 in the nose section of the missile.

In the arrangement shown in FIG. 1, the output of the logic circuitry 29 is indicated on a test panel 30. When the unit is used in the field, however, the indication may be exhibited on a cockpit display panel, for example, in an aircraft. The target simulator 12 is connected to switching logic circuitry 18 through which the diodes 17 may be sequentially illuminated to simulate rays emanating from a moving target. A power supply 32 and an oscillator 34 supply the necessary current to the simulator.

The detector 28 is a four quadrant IR detector which is affected by the angle in which the rays are received. The missile seeker system being tested is designed to correct for the amount of deviation of the beam angle from the missile seeker line axis.

The target simulator 12 comprises a sequencing infrared source that uses five binary coded inputs to select the desired target. One input is utilized to select either azimuth or elevation and the other four inputs are used to select infrared sources from −10° to +10° in 2° increments. The binary code input allows one infrared source to emit at a time and allows the selection of any one source at any desired time, that is, the target simulator does not have to be sequenced, it can step from −10° to 0° in one step.

The target simulator situation differs from actual conditions in that the target simulator 12 does not flood the entire mirror area but uses only a one quarter inch column of parallel light rays. The results and the reaction of the missile tracking system 29, however, is the same. The light emitting diodes 17 are actuated by diode drivers 16 in response to signals from switching logic panel 18.

The diodes 17 may be arranged in orthogonal linear array or any other desired pattern within the viewing envelope of the missile.

Figure 2:
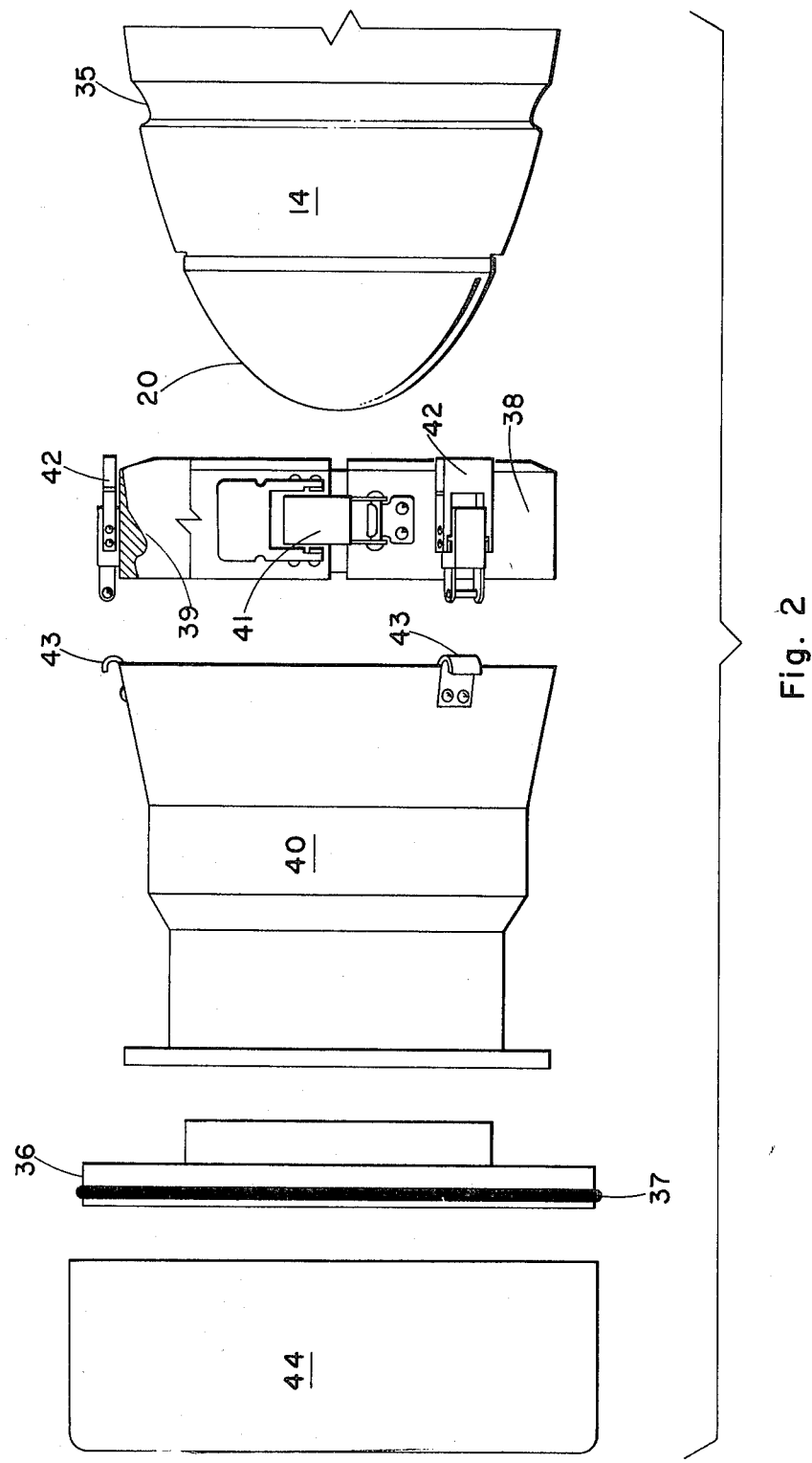
FIG. 2 is an exploded view of one embodiment of a target simulator useable with the system of FIG. 1.

In addition to the laboratory type arrangement of FIG. 1, the diode array may be fastened directly to the missile nose 14, shown in FIG. 2. The nose of the missile has an annular groove 35 which may be used to fasten the diode carrier 36 using a split collar 38 and an adaptor 40. The collar 38 has an internal contour 39 complementary to the contour of the missile nose at groove 35.

The collar is installed around nose 14 of the missile at groove 35 and fastened by means of a clamp 41. The collar carries three similar clamp members 42 designed to interact with hooks 43 on adapter 40. When thus connected, the collar and adaptor form a hollow integral light shield around missile window 20.

The diode carrier 36 is fastened in place in the forward end of adaptor 40 and protected by a cover 44. Carrier 36 is shown with an "O" ring 45 installed in a peripheral groove to aid in preventing dust and moisture from penetrating under the cover 44 when the unit is assembled. In practice, the diode carrier 36 remains assembled to the adaptor 40 with the cover 44 in place unless disassembly is necessary, for example, for repair.

Figure 3:
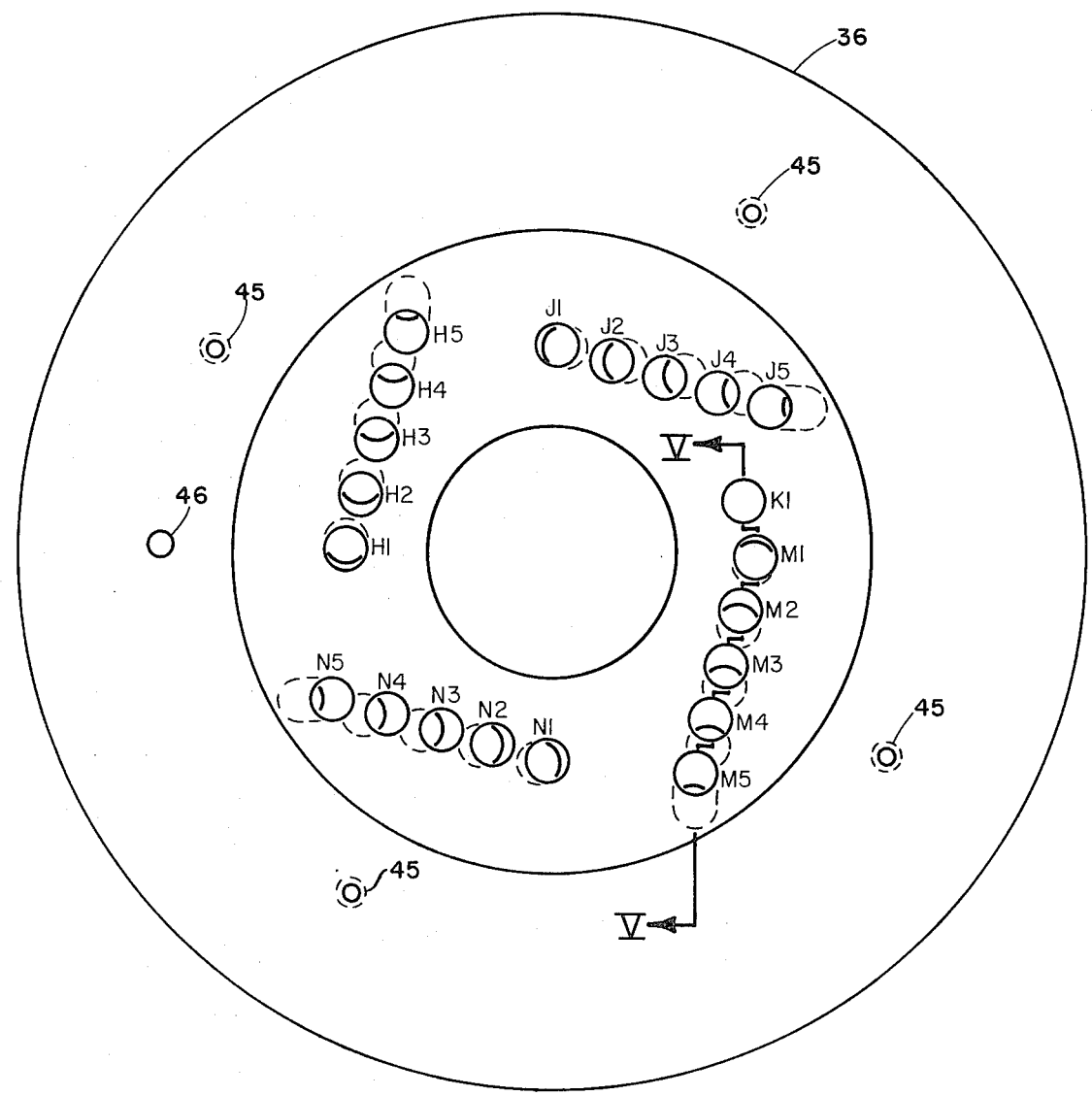
FIG. 3 is a plan view of the diode carrier of FIG. 2.

A preferred arrangement of the diodes in carrier 36 is shown in FIG. 3. Although a simple orthogonal intersecting pattern was used satisfactorily in early models, the diode array shown in FIG. 3 has been found to be more versatile, covering a greater area of the missile optics with a minimum size of the diodes array.

It will be noted that only the diode mounted in hole K1 will be on boresight parallel to the missile axis. The remainder of the diodes are mounted in holes in four rows forming roughly the sides of a square superimposed on the torroidal field of view of the missile optics at the close range of the test unit. The row of holes M1 through M5 is typical and the angular placement of the holes is more clearly shown in FIG. 5. FIG. 3 also shows four holes used for mounting the carrier to adaptor 40 and one hole 46 which mates with a locator pin (not shown) to ensure proper alignment of carrier and adaptor during assembly.

Figure 4:
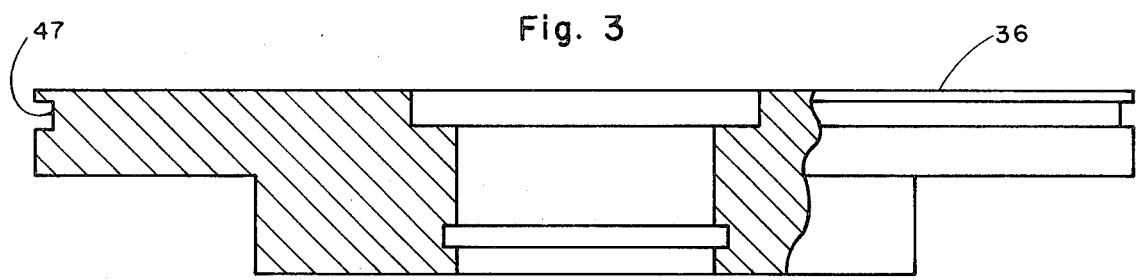
FIG. 4 is a side elevational view of the carrier of FIG. 3 partly in section.

FIG. 4 shows the shape of carrier 36 and the "O" ring groove 47 around the periphery.

Figure 5:
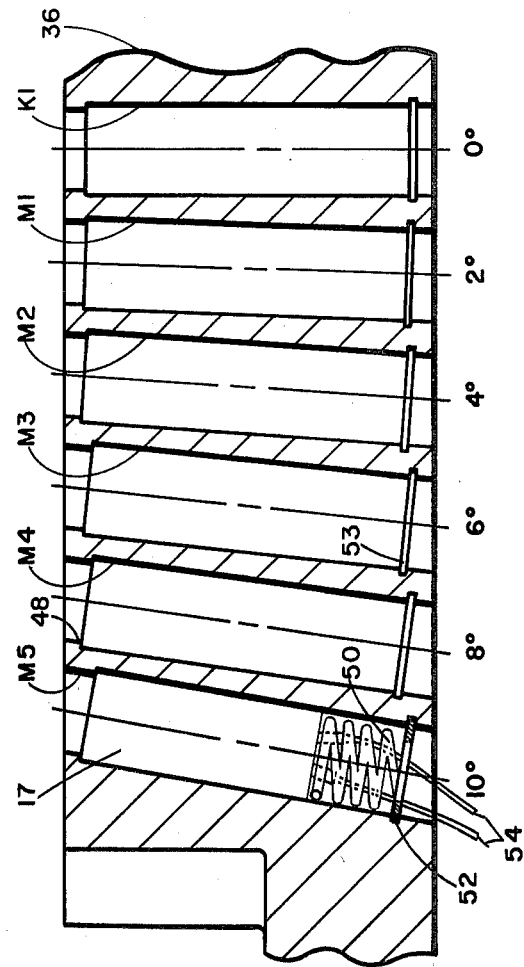
FIG. 5 is an enlarged cross sectional view taken along line V—V of FIG. 3.

FIG. 5 shows the boresight diode hole K1 and the holes M1 through M5 ranging from 2° to 10° angle to boresight. The rows N, H and J shown in FIG. 3 are similarly arranged with respect to boresight and two imaginary lines X and Y orthogonally intersecting the line of boresight. In the table below the legend < to 'X' indicates deviation from boresight along line X and < to 'Y' means that deviation from boresight along line Y.

HOLE DATA

| HOLE SYMBOL | TO 'X' ± 0°2' | TO 'Y' ±0°2' |
| --- | --- | --- |
| H1 | 2° | 0° |
| H2 | 4° | 0° |
| H3 | 6° | 0° |
| H4 | 8° | 0° |
| H5 | 10° | 0° |
| J1 | 0° | 2° |
| J2 | 0° | 4° |
| J3 | 0° | 6° |
| J4 | 0° | 8° |
| J5 | 0° | 10° |
| K1 | 0° | 0° |
| M1 | 2° | 0° |
| M2 | 4° | 0° |
| M3 | 6° | 0° |
| M4 | 8° | 0° |
| M5 | 10° | 0° |
| N1 | 0° | 2° |
| N2 | 0° | 4° |
| N3 | 0° | 6° |
| N4 | 0° | 8° |
| N5 | 0° | 10° |

The diodes 17 fit into the holes and are held against a shoulder 48 by a compression spring 50 which is held in place by a lock ring 52 fitted into a groove 53 in the side wall of the hole. The electrical leads 54 of the diodes are led through the center of springs 50 to connection boards (not shown) which may be fastened to the surface of carrier 36. The electrical system of target simulator 12 is schematically shown in FIG. 6.

Figure 6:
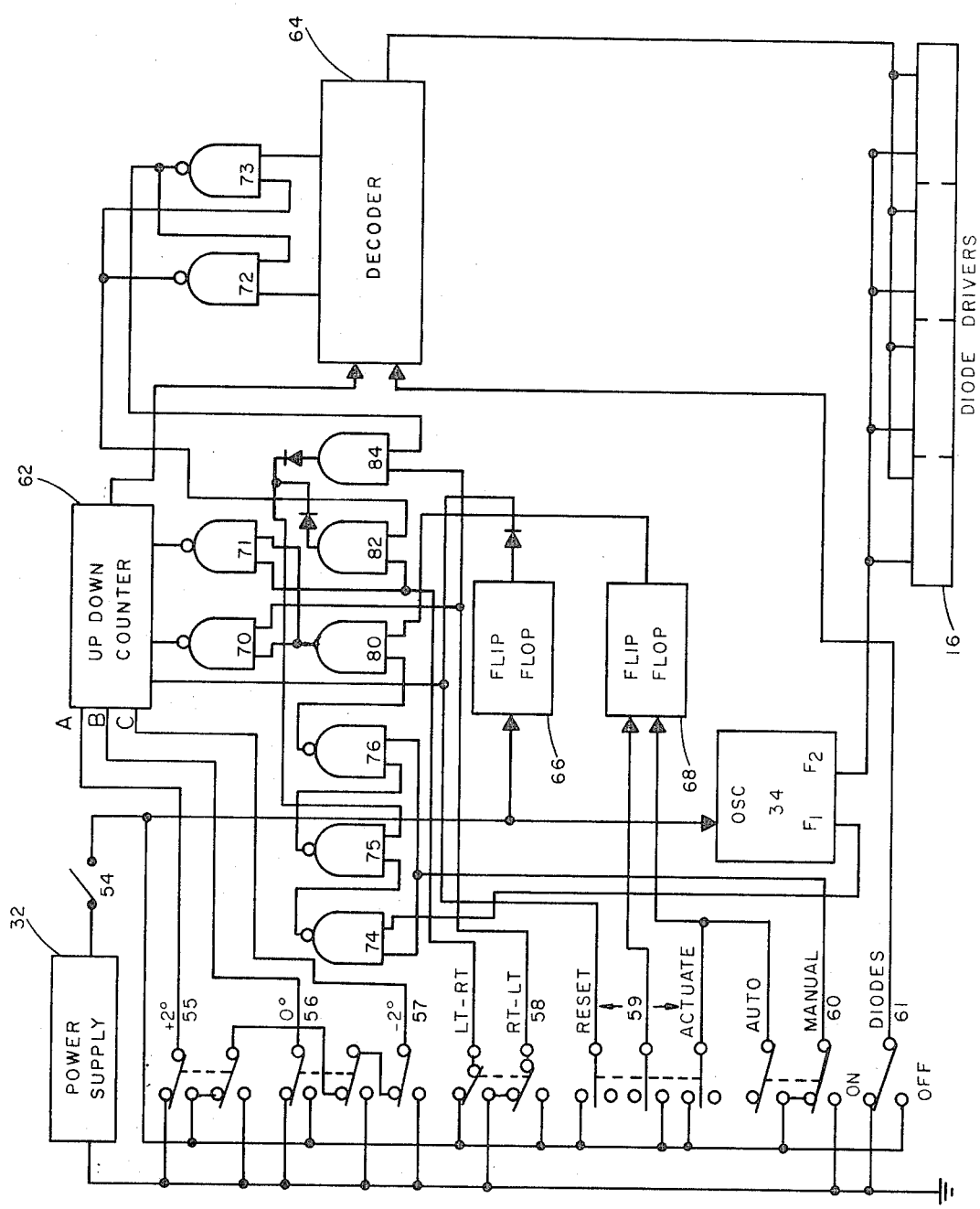
FIG. 6 is a simplified diagram of a switching logic circuit useable with the system.

The power supply 32 furnishes power to the system through a Master switch 54 and a series of control switches shown on the left hand side of the FIG. 6 diagram.

Switches 55, 56 and 57 may be used to manually select either the +2° diode M1, the 0° diode K1 or the −2° diode H1 respectively, for example, to align the test set with the missile system. Switch 58 selects the direction of sequencing of the diodes. The reset & function actuate switch 59 is a three-position switch, normally open, and may be positioned in the function actuate or in the reset position as desired. To actuate the test arrangement, switch 59 is placed in its lower or function actuate position. When switch 59 is moved to the reset or upper position, the system returns to a condition in which the −10° diode H5 is ON (See FIG. 3).

The automatic-manual switch 60 is normally in the automatic mode but may be switched to the lower or manual position as desired.

The diode ON/OFF switch 61 is provided so that the light emitting diodes may be turned off leaving the remainder of the system on standby.

Selection is made through the operation of an Up-Down Counter 62 and a Decoder 64 with associated flip flops 66, 68 ythrough logic NAND gates 70–76 and AND gates 80, 82 and 84.

When the Diode ON/OFF switch, 61, is placed in the lower position in FIG. 2, voltage (Logic ONE) is supplied to inhibit decoder 64. If the automatic-manual switch 60 is in the upper position as shown, a logic ONE will be supplied to the NAND Gates 74 and 76. With the Left-to-Right and Right-to-Left switch 58 in the upper position as shown, a logic ONE will be supplied to NAND gate 71 and AND gate 82. At the same time switch 58 places a Logic Zero on NAND gate 70 and AND gate 84. Also with switches 55, 56 and 57 in position shown, a logic ONE will be supplied to input terminal C of the up-down counter 62 and terminals, A, B and C will be at ZERO.

Desiring now to actuate the mechanism, if the Reset-actuate switch 59 be placed in the lower position, then a logic ONE will be supplied to flip flop (one shot) 68. When the decoder 64 is at rest, the outputs to the diode drivers 16 and to NAND gate 72 is at a logic ZERO. A logic zero on NAND gate 72 causes a logic ONE output which enables the AND gate 82 which puts a logic ONE on NAND gate 75 allowing the clock pulse from the oscillator to carry through. Since 74 and 76 were already enabled there is an output signal from 76 of alternating ONE-ZERO going to AND Gate 80, which has a logic ONE applied to the other terminal, as related above. Thus we get a logic ONE-ZERO alternating from AND gate 80 going to NAND gate 70. The other terminal of gate 70 has already been enabled as stated above, an alternating ONE-ZERO signal goes to the up-down counter 62. The counter 62 then starts counting in one direction or the other and signals are presented to the decoder 64. These signals cause the decoder 64 to start outputting signals from eleven output terminals in sequence to various terminals of diode drivers 16.

These signals from decoder 64 in turn activate diode drivers 16 through enabling circuitry to light up the light emitting diodes in sequence. When the last light emitting diode is illuminated in the right to left direction, the system comes to rest with the output terminals of decoder 64 in a ZERO condition and, in order to start the system again, the Left-Right switch must be changed to its opposite position and the Function Actuate switch again depressed.

What is claimed is:

1. Target simulating apparatus for investigating operational efficiency of a light energy sensitive tracking system having a finite viewing envelope;

said target simulating apparatus including;

a plurality of illuminable elements arranged to emit radiant energy waves toward said tracking system within the viewing envelope of said system;

means for individually illuminating selected ones of said elements; and means for illuminating said elements in timed sequence.

2. The apparatus of claim 1 wherein said elements are arranged in a plane orthogonal to the longitudinal axis of said viewing envelope and each element, when illuminated, emits radiation in a particular prearranged angular direction in relation to said axis.

3. The apparatus of claim 2 wherein said elements are arranged in a plurality of linear arrays forming roughly a square having sides approximately equidistant from said axis.

4. The apparatus of claim 3 wherein said angular relationship varies:
   a. along a first side of said square from 0° to 10° in a first direction(x);
   b. along a second side from 2° to 10° in a second direction (y) orthogonal to said first direction;
   c. along a third side from 2° to 10° in said direction (x); and
   d. along the fourth side from 2° to 10° in said direction (y).

5. The apparatus of claim 4 wherein said elements are electrically excitable infrared radiating devices and said means for illuminating said elements includes a source of regular electrical pulses of a predetermined frequency and electrical logic circuitry for controlling application of current to said devices.

6. The apparatus of claim 3 wherein said elements are electrically excitable infrared radiating devices and said means for illuminating said elements includes a source of regular electrical pulses of a predetermined frequency and electrical logic circuitry for controlling application of current to said devices.

7. The apparatus of claim 2 wherein said elements are electrically excitable infrared radiating devices and said means for illuminating said elements includes a source of regular electrical pulses of a predetermined frequency and electrical logic-circuitry for controlling application of current to said devices.

8. The apparatus of claim 2 wherein said elements are arranged in a plurality of linear arrays and wherein said angular direction for diodes in each array range from 2° to 10° and one additional element arranged to emit rays essentially parallel to said axis.

* * * * *